(12) United States Patent
Hardesty et al.

(10) Patent No.: US 8,694,433 B1
(45) Date of Patent: Apr. 8, 2014

(54) IMAGE CASHLETTER PROCESSING WITH REJECT REPAIR DEFERRAL

(75) Inventors: Jeoffrey E. Hardesty, Charlotte, NC (US); Clarence E. Lee, II, Arlington, TX (US); Lowell Huff, Manchester, MO (US); William Gollnick, Indian Trail, NC (US); Kerry Cantley, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 1146 days.

(21) Appl. No.: 12/146,796

(22) Filed: Jun. 26, 2008

(51) Int. Cl.
G06Q 40/00 (2012.01)
G06Q 20/00 (2012.01)
G06Q 20/04 (2012.01)
G06Q 20/20 (2012.01)

(52) U.S. Cl.
CPC .............. *G06Q 20/042* (2013.01); *G06Q 40/00* (2013.01); *G06Q 20/208* (2013.01)
USPC .................................. 705/45; 705/35; 705/23

(58) Field of Classification Search
USPC ......................................................... 705/45
See application file for complete search history.

(56) References Cited

U.S. PATENT DOCUMENTS

2007/0288382 A1* 12/2007 Narayanan et al. ............. 705/45

* cited by examiner

*Primary Examiner* — Ryan Zeender
*Assistant Examiner* — Denisse Ortiz Roman
(74) *Attorney, Agent, or Firm* — Michael A. Springs; Moore & Van Allen, PLLC; James C. Edwards

(57) ABSTRACT

A system and method for efficient image cashletter processing where an image cashletter including a plurality of monetary records is received. Failed monetary records in the image cashletter are separated out from good monetary records in the image cashletter. The good monetary records are processed independently of processing the failed monetary records, therefore, allowing the good monetary records to continue to be processed without having to wait for the failed monetary records to be repaired.

13 Claims, 4 Drawing Sheets

IMAGE CASHLETTER PROCESSING WITH REJECT REPAIR DEFERRAL

BACKGROUND OF THE INVENTION

The present invention is related to image cashletter processing, and more specifically to image cashletter processing with reject repair deferral.

Currently, paper checks that are used to pay bills and make purchases are being scanned to produce an electronic representation of each check. A cashletter typically contains a number of negotiable items or monetary records, mostly checks, and may be accompanied by a letter that lists the amounts and instructions for transmittal to other banks. In current environments, cashletters (or image cashletters) are processed as a single unit of work. Each individual monetary record in the cashletter must be verified and validated before the image cashletter is eligible to be delivered to downstream applications for further processing. As a result, if an image cashletter has any number of items that fail a bank's or other financial institution's magnetic ink character recognition (MICR) edits, the entire unit of work (i.e., image cashletter) will not be eligible for publishing or further processing until each of the MICR edit failures can be resolved and reconciled. Therefore, items in the cashletter that pass the MICR checks are held up along with the items that fail the MICR checks. Further, as image cashletter volume increases, the necessity to handle a large volume of items in a relatively short amount of time becomes more important. Cycle times likely deteriorate as more and more files that contain rejects are processed as a single unit of work. This causes processing delay of the good read items while waiting for the MICR failed items to be corrected.

BRIEF SUMMARY OF THE INVENTION

According to one aspect of the present invention, a method for efficient image cashletter processing includes receiving an image cashletter, the image cashletter comprising a plurality of monetary records, separating out failed monetary records in the image cashletter from good monetary records in the image cashletter, and processing the good monetary records independently of processing the failed monetary records.

According to another aspect of the present invention, a system for efficient image cashletter processing includes at least one workstation, and a server, the server including an image cashletter processing application, the server receiving an image cashletter from the at least one workstation, the image cashletter comprising a plurality of monetary records, separating out failed monetary records in the image cashletter from good monetary records in the image cashletter, and processing the good monetary records independently of processing of the failed monetary records.

According to a further aspect of the present invention, an apparatus comprises a storage medium with instructions stored therein, the instructions when executed causing a processing device to perform receiving an image cashletter, the image cashletter comprising a plurality of monetary records, separating out failed monetary records in the image cashletter from good monetary records in the image cashletter, and processing the good monetary records independently of processing the failed monetary records.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
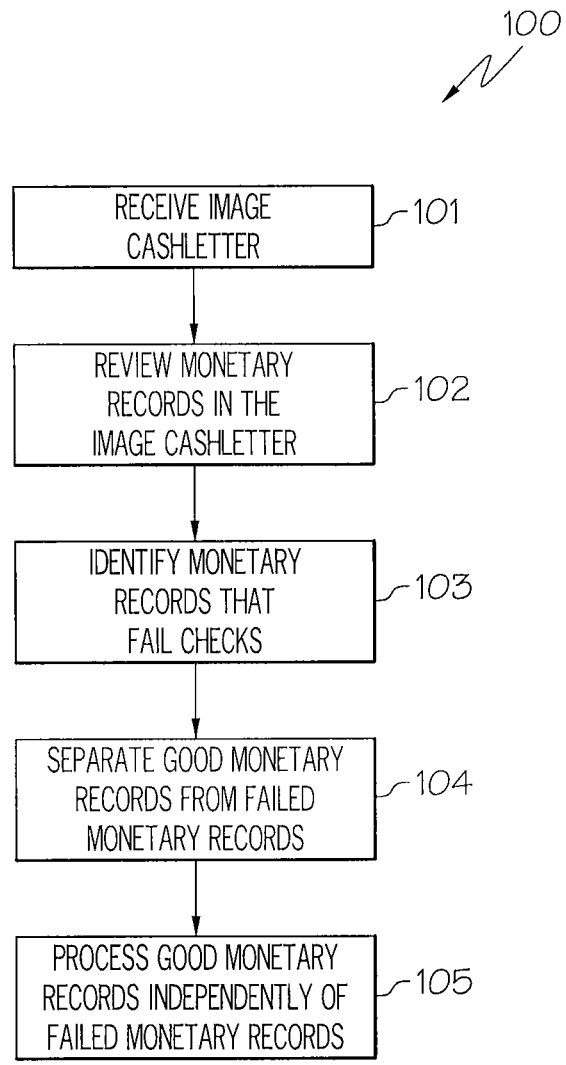
FIG. 1 is a flowchart of a process for efficient image cashletter processing according to an exemplary embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device. Note that the computer usable or computer readable medium could even be paper or another suitable medium upon which the program is printed, as the program can be electronically captured, via, for instance, optical scanning of the paper or other medium, then complied, interpreted, or otherwise processed in a suitable manner, if necessary, and then stored in a computer memory.

In the context of this document, a computer usable or computer readable medium may be any medium that can contain, store, communicate, or transport the program for use by or in connection with the instruction execution system, platform, apparatus, or device. Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the present invention, MICR failed items are separated from good read MICR items into separate units of work. Therefore, good read items do not experience a processing delay while waiting for the MICR failed items to be corrected. This improves end to end cycle time by allowing good read items to be processed while rejects are handled separately, therefore, preventing the good read items from being hindered by the rejects. Further, according to embodiments of the present invention, a graphical user interface (GUI) may be presented on a display to an operator allowing the operator to invoke a reject repair deferral process. This allows the operator to defer repairing of the MICR failed items to a next cycle or a next day if necessary.

Moreover, according to embodiments of the present invention, a unique serialized electronic offset debit record may be generated (i.e., in the form of a general ledger credit). MICR fields 5, 3, 2 and 1 may be based on a configuration value. The value of the debit may be to the total dollar amount of all outstanding rejects in the offset debit record. Field 7 of the general ledger ticket may be in the format of, for example, JJJINNNNNN, where "I" represents a configurable instance, "JJJ" represents a Julian Date, and "NNNNNN" represents a six digit numeric counter that may be incremented by a system.

Embodiments according to the present invention are capable of storing the reject records, debit/credit offset information, images, and all other associated information. This information may be recalled later for individual image processing. Further, the information may be stored/retained and recalled across multiple days. If information or data is held over to the next business day, all actions that may be taken on those items may be tracked on the current day's activity reports and processes (e.g., if a file is held over from 10/1 and is processed on 10/2, any rejects failed for "quality" may be part of the 10/2 administrative return files).

In addition, according to embodiments of the present invention, a new report may be generated for any files that have had their rejects deferred and are still outstanding at the end of the day. The report may list information such as, for example, outstanding original file name and system file ID, dollar value of each cashletter in the file held over, detail listing of each reject repair item, etc. Further, the original item (cashletter) sequence number for the reject items may be retained. For files that have their reject items deferred and file completion does not happen until the end of the day (EOD), the published and cycle dates plus one may be modified to reflect the active date. Files that have their rejects deferred may cause a new cashletter to be created with the accumulation of all rejects in the original file. The credit value of the new cashletter may correspond to the debit inserted in the original file. The serial number of the credit may match the preceding debit placed in the original file. All other MICR fields may be configurable (but static) values.

FIG. 1 shows a flowchart of a process for efficient image cashletter processing according to an exemplary embodiment of the present invention. In the process 100, in block 101 an image cashletter may be received. In block 102, monetary records in the received image cashletter may be reviewed and/or checked. In block 103, monetary records in the image cashletter that fail checks may be identified. The checks may be any type of monetary record checks, for example, MICR checks. Other types of monetary record checks may also be included and be within the scope of the present invention. In block 104, good monetary records in the image cashletter may be separated from failed monetary records in the image cashletter and in block 105, the good monetary records processed separately and independently from the failed monetary records.

Figure 2:
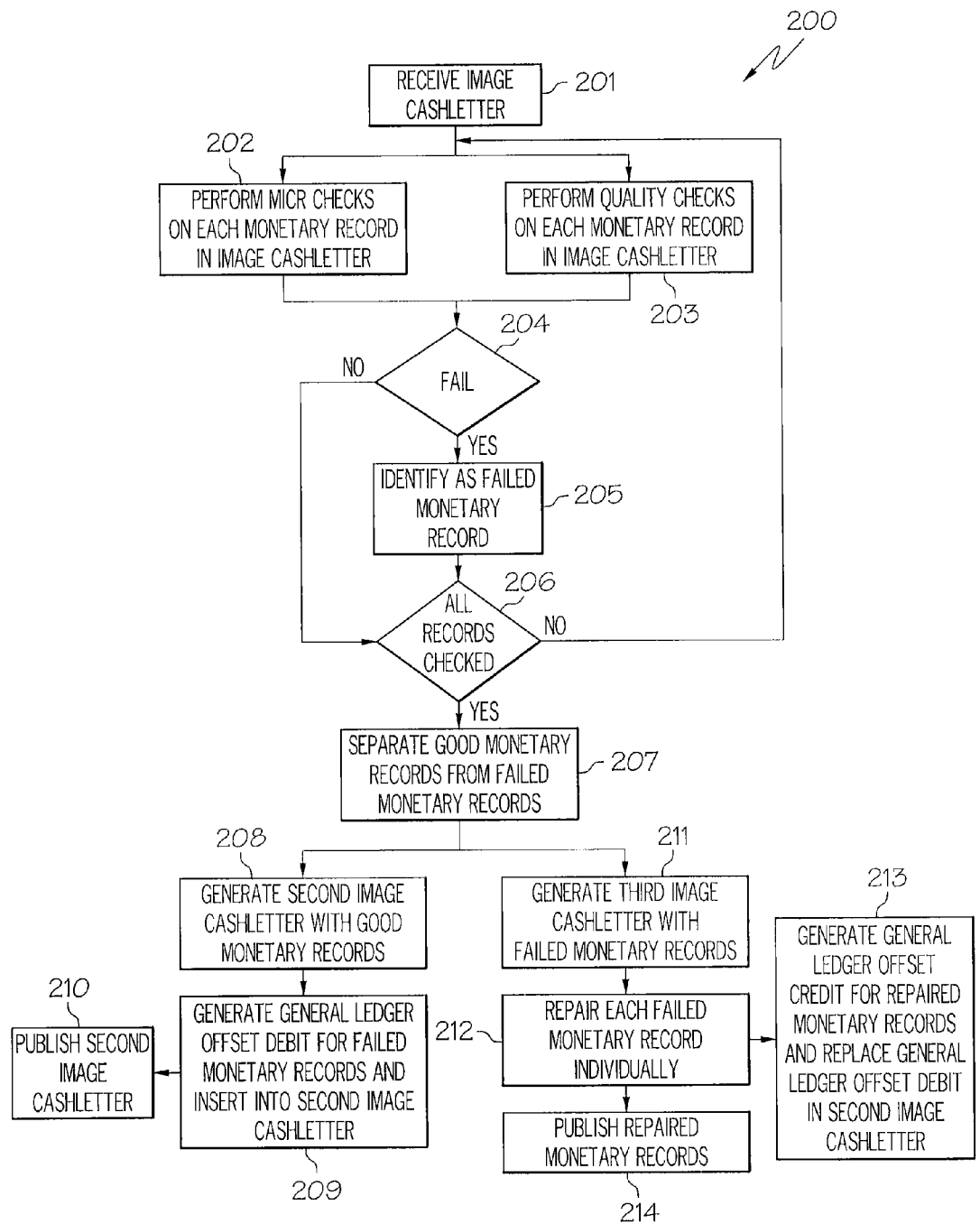
FIG. 2 is a flowchart of a process for efficient image cashletter processing according to another exemplary embodiment of the present invention.

FIG. 2 shows a flowchart of a process for efficient image cashletter processing according to another exemplary embodiment of the present invention. In the process 200, in block 201 an image cashletter may be received. In block 202, MICR checks may be performed on each monetary record in the image cashletter. Further, in block 203, after receiving the image cashletter, quality checks may be performed on each monetary record in the image cashletter. In block 204, it may be determined if any of the monetary records have failed and if so, in block 205, the monetary record may be identified as a failed monetary record and then in block 206, it may be determined if all records have been checked. If the monetary record has not failed, then in block 206, it may be determined if all records have been checked and if not, the process returns to blocks 202 and 203. If all monetary records in the image cashletter have been checked, then in block 207, the good monetary records may be separated out from the failed monetary records. In block 208, a second image cashletter may be generated with the good monetary records and then in block 209, a general ledger offset debit may be generated for the failed monetary records and inserted into the second image cashletter. In block 210, the second image cashletter may then be published.

After the monetary records have been separated out, in block 211, a third image cashletter may be generated with the failed monetary records and then in block 212, each failed monetary record may be repaired individually. Then, in block 213, a general ledger offset credit may be generated for the repaired monetary records and used to replace the general ledger offset debit in the second image cashletter. Also, in block 214, the repaired monetary records may be published.

Figure 3:
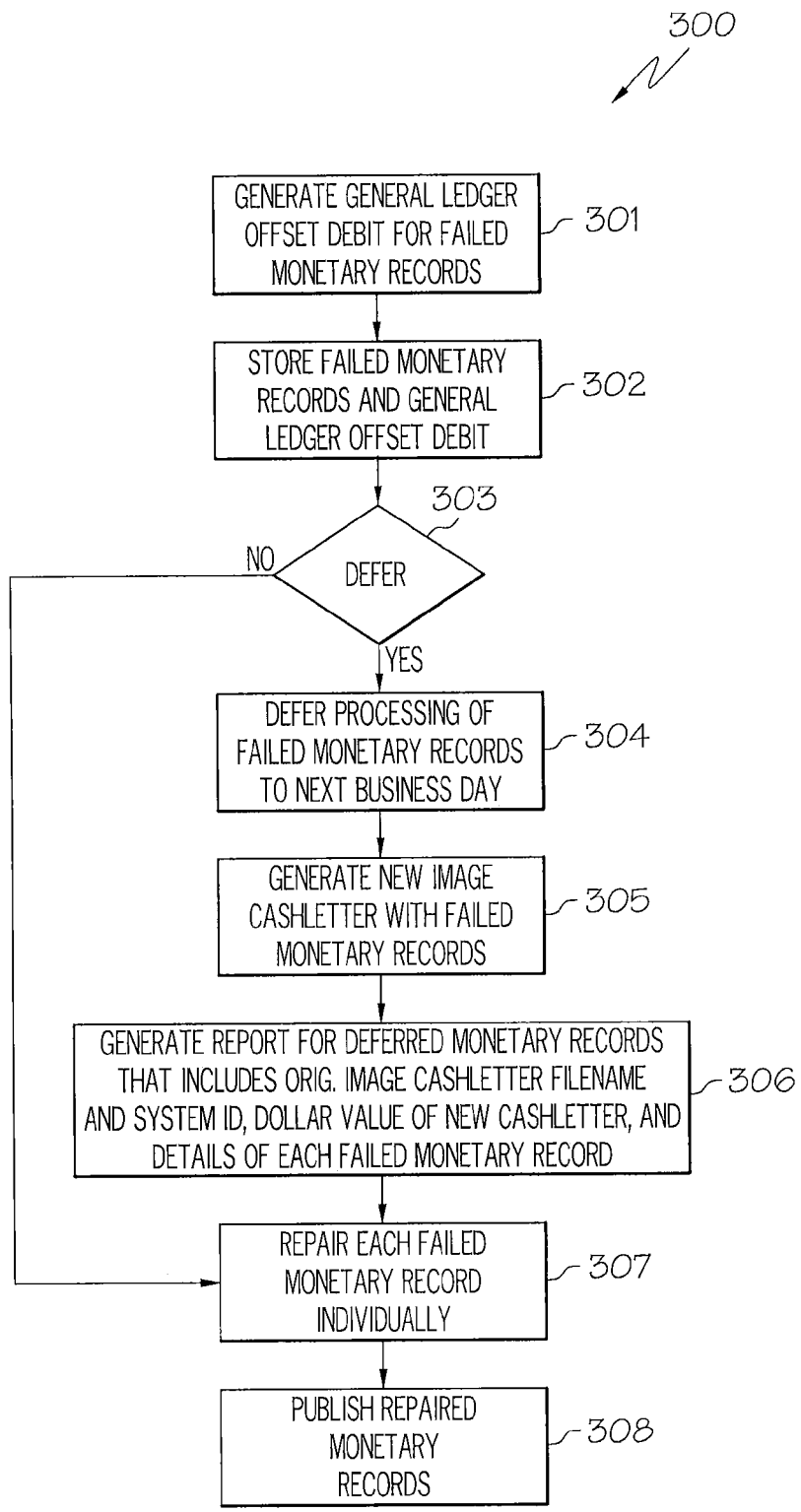
FIG. 3 is a flowchart of a process for deferring failed monetary records according to an exemplary embodiment of the present invention.

FIG. 3 shows a flowchart of a process for deferring failed monetary records according to an exemplary embodiment of the present invention. In the process 300, in block 301, a general ledger offset debit may be generated for failed monetary records in an image cashletter. In block 302, the failed monetary records may be stored along with the general ledger offset debit. In block 303, it may be determined whether to defer processing of the failed monetary records and if not, in block 307, each failed monetary record may be repaired individually and then in block 308, the repaired monetary records may be published. If it is decided to defer processing the failed monetary records, then in block 304, processing of the failed monetary records may be deferred to a next business day. In block 305, a new image cashletter may be generated with the failed monetary records. In block 306, a report for the deferred monetary records may be generated that includes the original image cashletter found and the system ID, dollar value of the new cashletter, and details of each failed monetary record. In block 307, each failed monetary record may then be repaired individually. In block 308, the repaired monetary records may be published.

Figure 4:
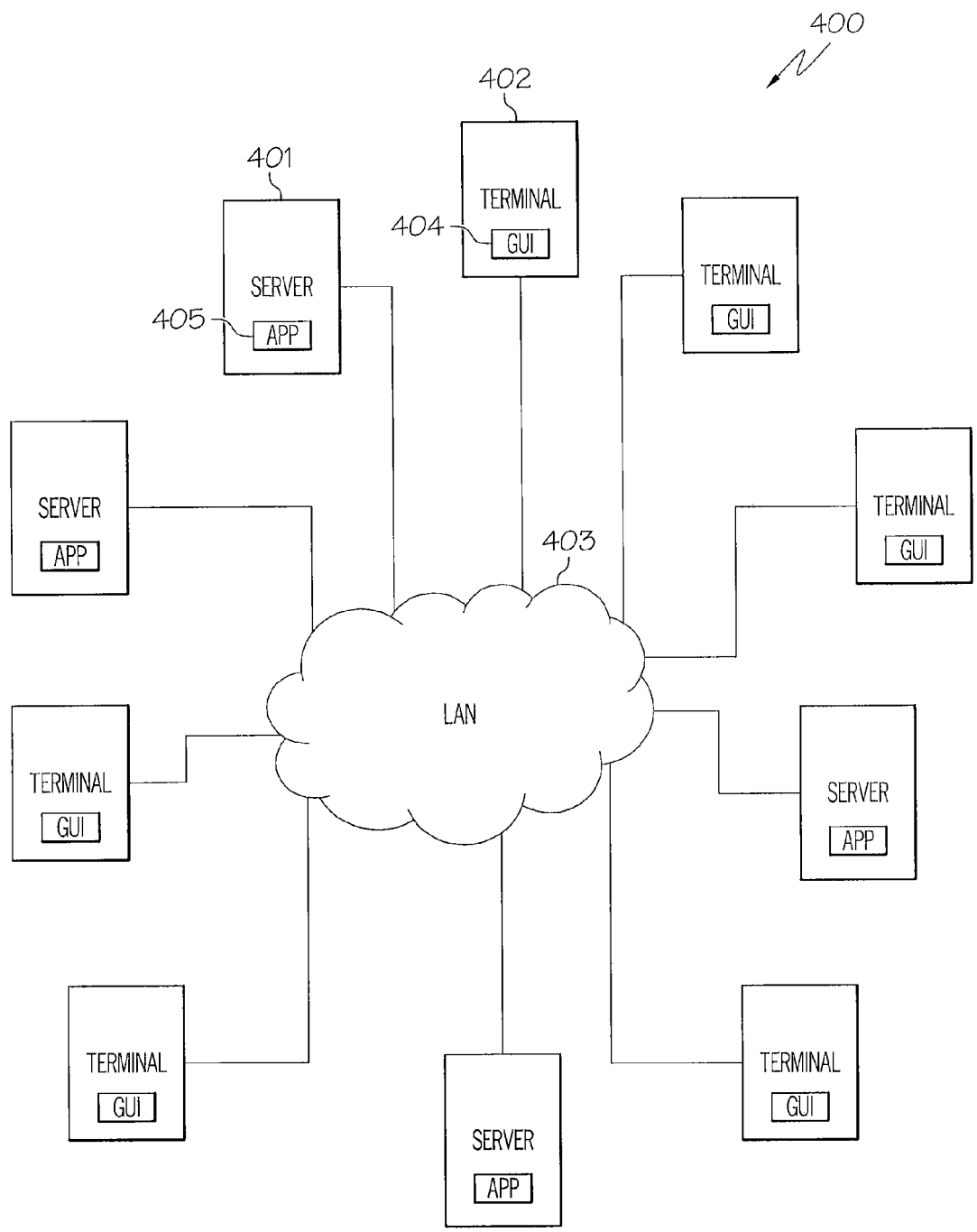
FIG. 4 is a diagram of a system for efficient image cashletter processing according to an exemplary embodiment of the present invention.

FIG. 4 shows a diagram of a system for efficient image cashletter processing according to an exemplary embodiment of the present invention. The system 400 may include one or more workstations 402 and one or more servers 401, where the one or more workstations 402 and the one or more servers 401 are interconnected via a network 403. The network 403 may be a local area network (LAN) or any other type of network, for example, the Internet. Each workstation 402 may include a graphical user interface (GUI) 404 that allows an operator to manage the processing of received image cashletters including deciding to defer processing of rejected monetary records in the image cashletters. Further, each server 401 may include an image cashletter processing application 405. The image cashletter processing application 405 may perform various types of processing such as, for example, receiving an image cashletter from the at least one workstation 402, separating out failed monetary records in the image cashletter from good monetary records in the image cashletter, and processing the good monetary records independently of processing the failed monetary records. Although not shown, the system may also include monetary record analyzers/checkers (e.g., MICR checks) that may be in the form of one or more devices, software, or a combination thereof.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for efficient image cashletter processing comprising:
  receiving, by a computing device processor, a first image cashletter, the first image cashletter comprising a plurality of monetary records;
  performing, by a computing device processor, a plurality of image-related read checks, including a Magnetic Ink Character Recognition (MICR) check and an image quality check, on each monetary record in the received first image cashletter;
  identifying, by a computer device processor, one or more of the monetary records as failed monetary records based on the one monetary records failing at least one of the image-related read checks;
  separating out, by a computer device processor, the one or more failed monetary records in the first image cashletter from acceptable monetary records in the first image cashletter, wherein the acceptable monetary records passed all of the image-related read checks;
  generating, by a computer device processor, a second image cashletter that includes (1) all of the acceptable monetary records from the first image cashletter and (2) a general ledger offset debit having a value equal to a total amount of the failed monetary records;
  generating, by a computer device processor, a third image cashletter that includes all of the failed monetary records from the first image cashletter;
  repairing each of the failed monetary records in the third image cashletter;
  generating, by a computer device processor, a general ledger offset credit having a value equal to a total amount of the repaired monetary records and replacing the general ledger offset debit in the second image cashletter with the general ledger offset credit; and
  processing, by a computer device processor, the second image cashletter independently of processing the third image cashletter.

2. The method according to claim 1, wherein a total credit value of the third image cashletter is equal to the value of the general ledger offset debit.

3. The method according to claim 2, further comprising storing, in computing device memory, the third image cashletter and the general ledger offset debit.

4. The method according to claim 3, further comprising generating, by a computing device processor, a report for one or more stored third image cashletters deferred to a following day and not processed on a current day.

5. The method according to claim 4, wherein the report comprises at least one of a filename of each third image cashletter, a dollar value of each stored third image cashletter deferred, and a detailed listing of each failed monetary record.

6. The method according to claim 1, further comprising publishing, by a computing device processor, the third image cashletter.

7. The method according to claim 1, further comprising publishing, by a computing device processor, the second image cashletter.

8. A system for efficient image cashletter processing comprising:
- at least one workstation; and
- a server, the server including an image cashletter processing application, the server configured to:
  - receive a first image cashletter from the at least one workstation, the first image cashletter comprising a plurality of monetary records,
  - perform a plurality of image-related read checks, including a Magnetic Ink Character Recognition (MICR) check and an image quality check, on each monetary record in the received first image cashletter,
  - identify one or more of the monetary records as failed monetary records based on the one monetary records failing at least one of the image-related read checks,
  - separate out the one or more failed monetary records in the first image cashletter from acceptable monetary records in the first image cashletter, wherein the acceptable monetary records passed all of the image-related read checks,
  - generate a second image cashletter that includes (1) all of the acceptable monetary records from the first image cashletter and (2) a general ledger offset debit having a value equal to a total amount of the failed monetary records,
  - generate a third image cashletter that includes all of the failed monetary records from the first image cashletter,
  - in response to repairing each of the failed monetary records in the third image cashletter, generate a general ledger offset credit having a value equal to a total amount of the repaired monetary records and replacing the general ledger offset debit in the second image cashletter with the general ledger offset credit, and
  - process the second image cashletter independently of processing the third image cashletter.

9. The system according to claim 8, wherein a total credit value of the third image cashletter is equal to the value of the general ledger offset debit.

10. The system according to claim 8, further comprising a database, the database configured to store the third image cashletter and the general ledger offset debit.

11. The system according to claim 8, wherein the server is further configured to generate a report for one or more stored third image cashletters deferred to a following day and not processed on a current day.

12. The system according to claim 11, wherein the report comprises at least one of a filename of each third image cashletter, a dollar value of each stored third image cashletter deferred, and a detailed listing of each failed monetary record.

13. An apparatus comprising a storage medium with instructions stored therein, the instructions when executed causing a processing device to perform:
- receiving a first image cashletter, the first image cashletter comprising a plurality of monetary records;
- performing a plurality of image-related read checks, including a Magnetic Ink Character Recognition (MICR) check and an image quality check, on each monetary record in the received first image cashletter;
- identifying one or more of the monetary records as failed monetary records based on the one monetary records failing at least one of the image-related read checks;
- separating out the one or more failed monetary records in the first image cashletter from acceptable monetary records in the first image cashletter, wherein the acceptable monetary records passed all of the image-related read checks;
- generating a second image cashletter that includes (1) all of the acceptable monetary records from the first image cashletter and (2) a general ledger offset debit having a value equal to a total amount of the failed monetary records;
- generating a third image cashletter that includes all of the failed monetary records from the first image cashletter;
- in response to repairing each of the failed monetary records in the third image cashletter, generating a general ledger offset credit having a value equal to a total amount of the repaired monetary records and replacing the general ledger offset debit in the second image cashletter with the general ledger offset credit; and
- processing the second image cashletter independently of processing the third image cashletter.

* * * * *